Jan. 22, 1952 K. R. SPANGENBERG 2,583,023

AUTOMATIC FREQUENCY CONTROL FOR KLYSTRON OSCILLATORS

Filed May 21, 1947 2 SHEETS—SHEET 1

INVENTOR.
KARL R. SPANGENBERG

BY Robert Harding Jr.

ATTORNEY

Jan. 22, 1952 K. R. SPANGENBERG 2,583,023

AUTOMATIC FREQUENCY CONTROL FOR KLYSTRON OSCILLATORS

Filed May 21, 1947 2 SHEETS—SHEET 2

INVENTOR.
KARL R. SPANGENBERG

BY Robert Harding Jr.

ATTORNEY

Patented Jan. 22, 1952

2,583,023

UNITED STATES PATENT OFFICE 2,583,023

AUTOMATIC FREQUENCY CONTROL FOR KLYSTRON OSCILLATORS

Karl R. Spangenberg, Palo Alto, Calif., assignor to International Standard Electric Corporation, New York, N. Y., a corporation of Delaware Application May 21, 1947, Serial No. 749,508

1 Claim. (Cl. 250—36)

This invention relates to oscillation generators of the type which is capable of producing oscillations at frequencies above 1000 mc./sec. More particularly, my invention is concerned with problems of frequency stabilization and constant output of an oscillation generator which employs a so-called reflex "Klystron" discharge tube. "Klystron" is a trade name believed to be owned by the Sperry Gyroscope Co., Inc. The tube which is so called, its characteristics and uses, were described in an article by William E. Moulic in "Electronic Industries" and in the June 1944 issue thereof.

Broad band reflex klystron oscillators have been built for use in frequency-modulation systems, and according to the prior art it has been found that the reflector voltage must be changed as the resonant frequency of the attached cavity is changed. This is usually done by means of a potentiometer which is connected mechanically to the cavity tuning device. The linkage needs to be non-linear because the cavity tuning is usually linear with wave-length while the required reflector voltage is usually linear with frequency.

It is an object of my invention to provide an electronic circuit for performing the functions of a potentiometer having mechanical linkage to a cavity tuning device and to provide means for so utilizing such a circuit that no mechanical linkages are required.

It is another object of my invention to provide means for automatically adjusting the reflector voltage of a reflex klystron oscillator as the resonator tuning is changed so that maximum output will be given at all times. Thus, when the resonant frequency of the cavity is varied the electronic circuit will automatically change the reflector voltage in the right direction and make it assume the proper value so that the output will remain at a maximum.

Figure 1:
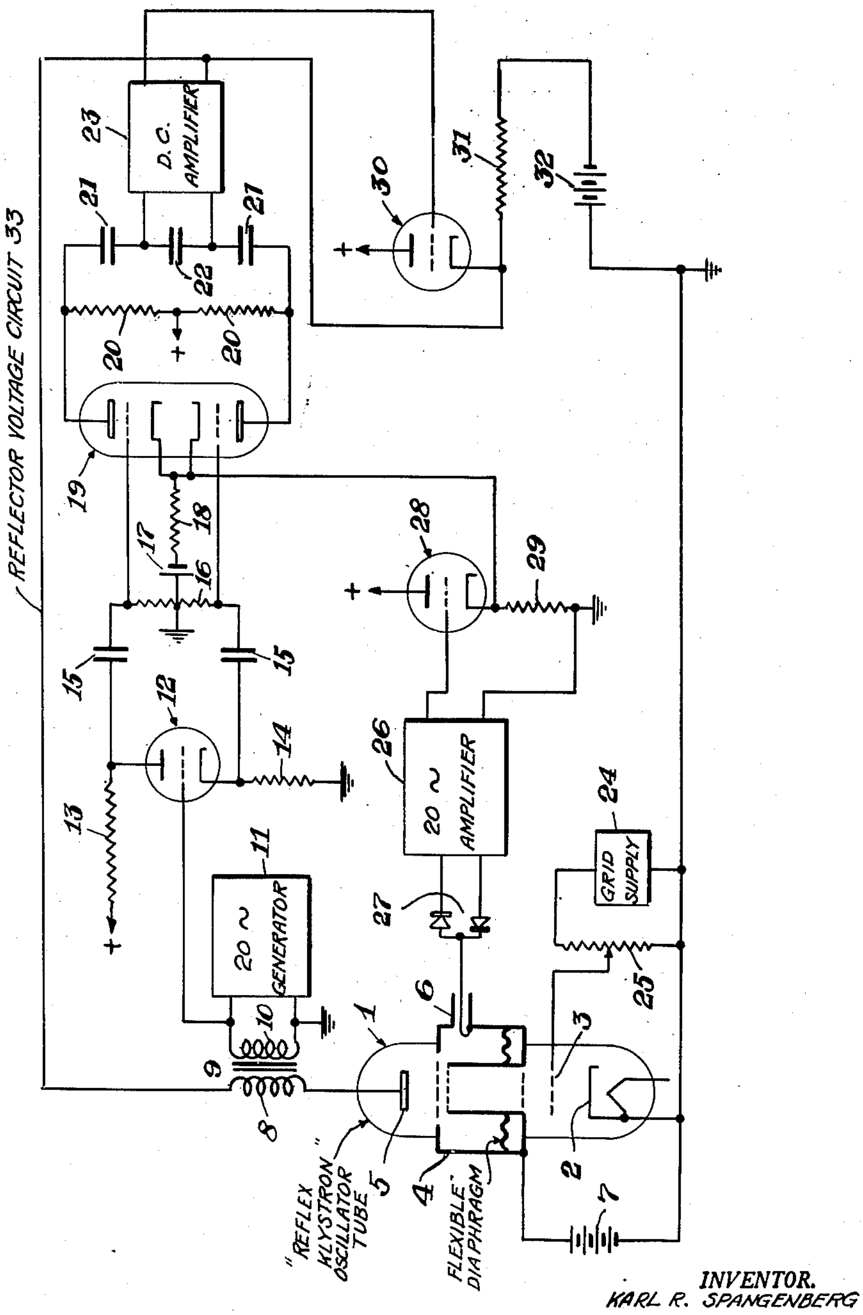
Figure 2:
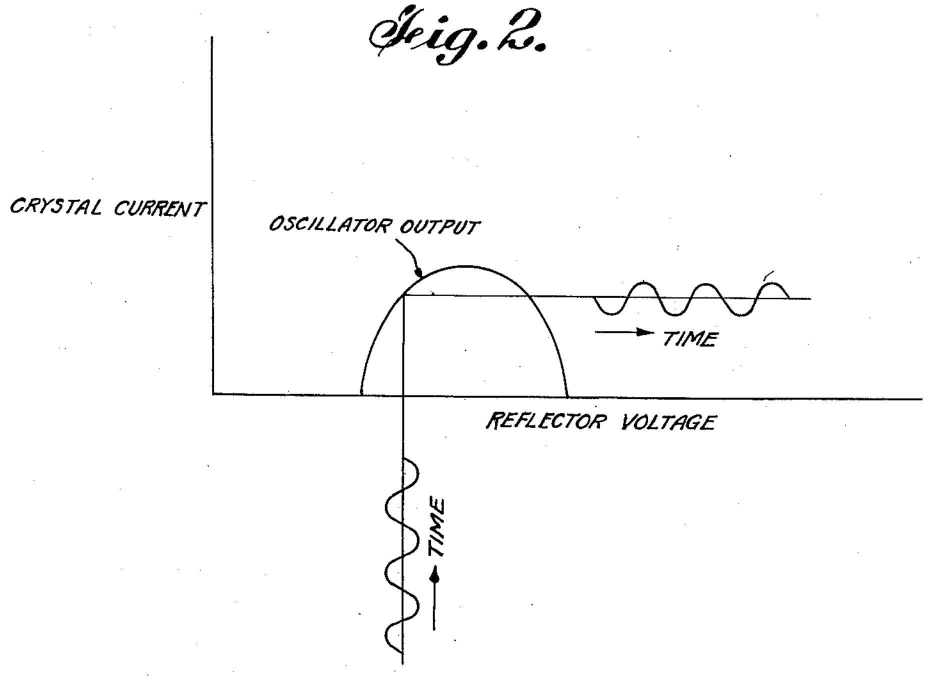
Figure 3:
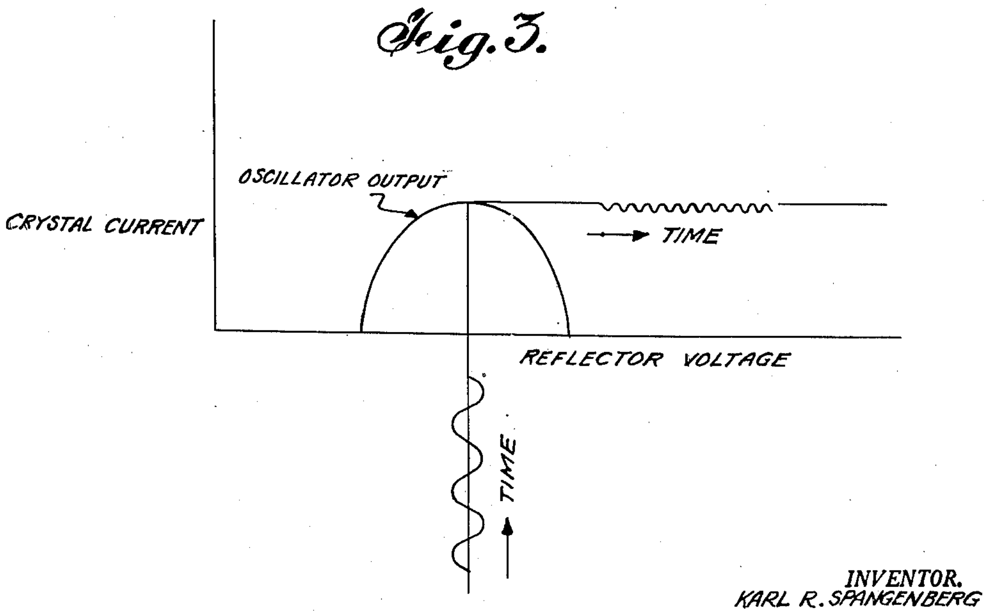

In describing my invention reference will be made to the accompanying drawing in which:

Fig. 1 shows a preferred circuit arrangement for adjusting the reflector voltage in a klystron oscillator, Fig. 2 is a graphic chart showing the relation between oscillator output potential and reflector voltage when an adjustment of the latter is required; and Fig. 3 shows another graphic chart wherein the oscillator output has been utilized to produce proper tracking of the reflector voltage.

Before describing my improvements it may be well to review briefly the technique of generating oscillations by means of a klystron tube as it existed prior to my invention.

In order to develop frequencies much in excess of 1000 mc. it becomes necessary to use a tube in which the transit time of the electrons need not be limited to a fraction of the time required for one cycle of the frequency to be generated. One solution is velocity modulation of the electron stream from a gun similar to that employed in cathode ray tubes. The basic principle is that of periodically changing the velocity of electrons passing a certain point in a tube and allowing these electrons of different velocities to form bunches by drifting through the required distance. These bunches are formed due to the faster electrons catching up with the slower ones. The tube is so designed that as the electrons travel through a given distance bunches will occur once each cycle of the frequency to be generated.

These bunches of electrons can be made to deliver their energy to a resonant circuit of special type. The groups of electrons, coming as they do at periodic intervals, act in a manner similar to a periodic impulse applied to a pendulum causing it to oscillate at a regular frequency and amplitude.

The form of oscillator to which my invention relates utilizes the reflex principle for obtaining feedback. The electron beam is velocity modulated as it passes between resonator grids. A retarding electric field beyond these grids causes the electron beam velocity to decrease to zero and reflects the beam back through the resonator grids.

In Fig. 1 I show diagrammatically a reflex klystron tube 1 having a cathode 2 which is indirectly heated. A control grid is supplied with any suitable potential from a potentiometer 25 which obtains a suitable bias from a grid supply source 24. Depending upon other conditions the grid bias may be made either positive or negative with respect to the cathode.

Tube 1 is so constructed as to permit a flow of electrons in a beam which is directed through a grid 3 and through other grids that are suitably disposed with respect to certain orifices in a cavity resonator 4. The electron stream is directed toward a reflector electrode 5 but because of a negative bias applied to this electrode the electrons are for the most part turned back on their course and caused to re-enter the cavity resonator, where they become bunched and develop an alternating potential at a frequency which is determined by the dimensions and other physical characteristics of the resonator and by other circuit parameters as well as electrode potentials.

The reflector electrode 5 requires a certain bias potential which may vary from a few volts positive with respect to the cathode to several hundred volts negative. The reflector voltage is normally obtained from a biasing source 32, but it is an object of my invention to provide means for automatically varying the effective voltage applied to the reflector electrode 5, as will be explained in the description to follow.

The tube 1 is provided with a coaxial terminal 6 which serves as an output terminal. It is formed with a small wire loop by which coupling to the resonator is obtained. I utilize a component of the output energy which is fed to the inner conductor in the coaxial line 6. This component is subjected to full wave rectification, preferably by means of a crystal rectifier device 27.

The rectified output from device 27 is fed to the input circuit of a very low frequency amplifier 26. The output from amplifier 26 is utilized for corrective adjustment of the reflector voltage, as hereinafter explained.

A small low frequency voltage, say 20 cycles per second is obtained from a generator 11. The output from this generator is coupled to the reflector voltage circuit 33 through a transformer 9 having windings 8 and 10. Another component of output energy from generator 11 is fed to the input circuit of a phase inverter tube 12.

Tube 12 is supplied with anode potential through a resistor 13 connected to the positive terminal of a suitable source, the negative terminal of which is grounded. The cathode of tube 12 is connected to ground through a resistor 14. The output circuit is coupled through capacitors 15 to the input circuit of a push-pull amplifier stage the tube 19 of which may be a twin triode. This tube functions as a square law wattmeter, as will presently be explained.

The previously mentioned amplifier 26 has its output circuit coupled to the input circuit of an amplifier tube 28. This tube functions as a cathode follower. Its cathode is connected to ground through a cathode resistor 29, while its anode is connected to the positive terminal of a direct current source. The cathode of tube 28 and the common cathode of tube 19 are directly interconnected.

Variations of output from the klystron generator are indicated by the graphic representations of Figs. 2 and 3. The output contains a component which can be used to correct any misadjustment, this component being detected and amplified by the circuit 27, 26. It is found that that the power output as a function of the reflector voltage is a dome-shaped curve under practically all operating conditions. This curve shows the manner in which the wattmeter tube is controlled. Its push-pull operation is derived from the control potentials which are fed to its two input circuits by the phase inverter tube 12. But since the common cathode for the two triode sections is connected to the two input circuits through a resistor 18, a biasing source 17 and the grounded mid-point of the grid resistor 16, and since said common cathode is directly connected to the cathode of tube 28, hereinabove mentioned as subject to control by the output from the amplifier 26, it will be clear that tube 19 is in fact a wattmeter which has a sense response corresponding to the variations of output from the klystron tube.

The wattmeter tube 19 develops a push-pull output potential across the anode resistors 20, a D. C. operating source being connected to the junction between resistors 20. The output potential is also stored either positively or negatively in two capacitors 21, between which a third capacitor 22 is connected. The polarity of the charge depends upon the relative phase of the low frequency oscillator voltage (as obtained directly from the generator 11) and the corrective voltage component of the same frequency (as obtained from the cathode follower tube 28).

Capacitor 22 is disposed in the input circuit of a D. C. amplifier circuit 23, the output from which is applied to a cathode follower tube 30 which serves to regulate the reflector voltage. A fixed D. C. potential is applied to the anode of tube 30. Its cathode and the cathode 2 of the reflex klystron tube are interconnected. The cathode of tube 30 is also connected to a resistor 31 in series with the reflector voltage circuit 33, this circuit further including the biasing source 32.

Thus it will be seen that the cathode follower tube 30 responds to variations of output from the amplifier, which, in turn, depend upon the action of the wattmeter tube 19 in controlling the storage of charge either positively or negatively in the bridging capacitor 22. Retracing the operation further, it is apparent that the polarity of the charge stored in capacitor 22 depends upon variations of bias potential as applied to the cathode of the wattmeter tube 19. Such bias variations are produced by the varying conditions of frequency drift in the klystron tube 1. The compensating adjustment of the reflector voltage is, therefore, so applied as to restore the oscillator frequency and amplitude to their proper values.

The circuit arrangement herein disclosed is found to be useful in various applications of a reflex klystron oscillator. More particularly, however, it has special advantages when used in connection with the local oscillator of a broad band superhigh frequency receiver where the oscillator is of the reflex klystron type. In this application the invention dispenses with a mechanical tracking unit and insures that the klystron tube will deliver maximum output at all times. The invention is also useful in controlling the frequency and amplitude of super-high frequency signal generators in any case where reflex klystron tubes are employed.

My invention is capable of modification in various ways without departing from its spirit and scope. The exact details of the circuit arrangement herein shown and described are, therefore, to be considered as merely illustrative.

I claim:

A method of operating a reflex klystron having means for producing an electron beam, a reflecting electrode and a tunable cavity resonator, to select a given frequency and produce maximum output at said frequency comprising adjusting the physical dimensions of said resonator to have its peak resonance at said selected frequency, applying an output determining potential to said reflector electrode, modulating said potential with a wave having a frequency which is low compared to said selected frequency so as to vary the electron flow in said klystron, abstrating power from said cavity resonator which power varies in step with said low frequency wave, deriving an alternating voltage from said varying power, comparing said alternating voltage and said low frequency wave to derive a control output of a sign and magnitude dependent upon the magnitude of said alternating voltage and its phase relative to said low frequency wave, and varying said output determining potential in response to said control output so as to counteract any tendency of the output to deviate from a given mean value.

KARL R. SPANGENBERG.

REFERENCES CITED

The following references are of record in the file of this patent:

UNITED STATES PATENTS

| Number | Name | Date |
|---|---|---|
| 2,404,568 | Dow | July 23, 1946 |
| 2,462,857 | Ginzton et al. | Mar. 1, 1949 |
| 2,515,203 | Ernst | July 18, 1950 |